United States Patent [19]

Isberg et al.

[11] 4,310,972
[45] Jan. 19, 1982

[54] BRAKE CONTROL ASSEMBLY

[75] Inventors: Gary J. Isberg, Exeter; Klaus Wickman, Trail; David Reid, Fruitvale, all of Canada

[73] Assignee: Trail Manufacturing Limited, Huron Park, Canada

[21] Appl. No.: 108,240

[22] Filed: Dec. 28, 1979

[51] Int. Cl.³ .......................................... B27B 17/00
[52] U.S. Cl. .................................. 30/382; 188/77 R; 188/166
[58] Field of Search ........................... 188/77 R, 166; 192/89 A, 89 QT; 30/381, 382, 383, 384, 385, 386; 83/DIG. 1

[56] References Cited
U.S. PATENT DOCUMENTS

| | | |
|---|---|---|
| 1,976,406 | 10/1934 | McGiffert et al. |
| 2,480,343 | 8/1949 | Sully |
| 3,228,177 | 1/1966 | Coates |
| 3,292,742 | 12/1966 | Thomas |
| 3,485,326 | 12/1969 | Wilkin |
| 3,776,331 | 12/1973 | Gustafsson .................. 30/382 X |
| 4,057,900 | 11/1977 | Nagy et al. .................. 188/166 X |
| 4,091,896 | 5/1978 | Wieland et al. .............. 30/382 X |
| 4,121,339 | 10/1978 | Nikolich ...................... 30/381 |
| 4,156,477 | 5/1979 | Nagashima et al. ......... 30/381 X |
| 4,197,640 | 4/1980 | Murray ........................ 30/382 |

FOREIGN PATENT DOCUMENTS 976847 10/1975 Canada.
2610085 9/1977 Fed. Rep. of Germany ........ 30/382

*Primary Examiner*—George E. A Halvosa
*Attorney, Agent, or Firm*—Fulwider, Patton, Rieber, Lee & Utecht

[57] ABSTRACT

A brake control assembly for a chain saw has an operating lever provided with a hub portion alongside a housing of the saw and a guard portion adjacent a handle carried by the housing. The hub portion is pivotally mounted on the housing allowing the lever to be moved fore and aft. A brake drum associated with the drive-transmitting mechanism of the saw is engaged by a brake band when the lever is swung to a brake-on position. The pivotal connection for the hub portion also supports an actuating plate for rocking movement independently of the hub portion. There is a drive connection between the operating lever and the actuating plate which rocks the plate on the pivotal connection when the lever is moved fore and aft. A torsion spring tends to rock the actuating plate in one direction and urge the brake band into braking engagement with the drum. The housing is fitted with a resilient latch which engages the cam finger to hold the brake band out of braking engagement with the drum. The brake arrangement operates automatically when the lever is knocked forwardly and is reset in a normal brake-off position when the lever is pulled towards the rear of the housing.

4 Claims, 4 Drawing Figures

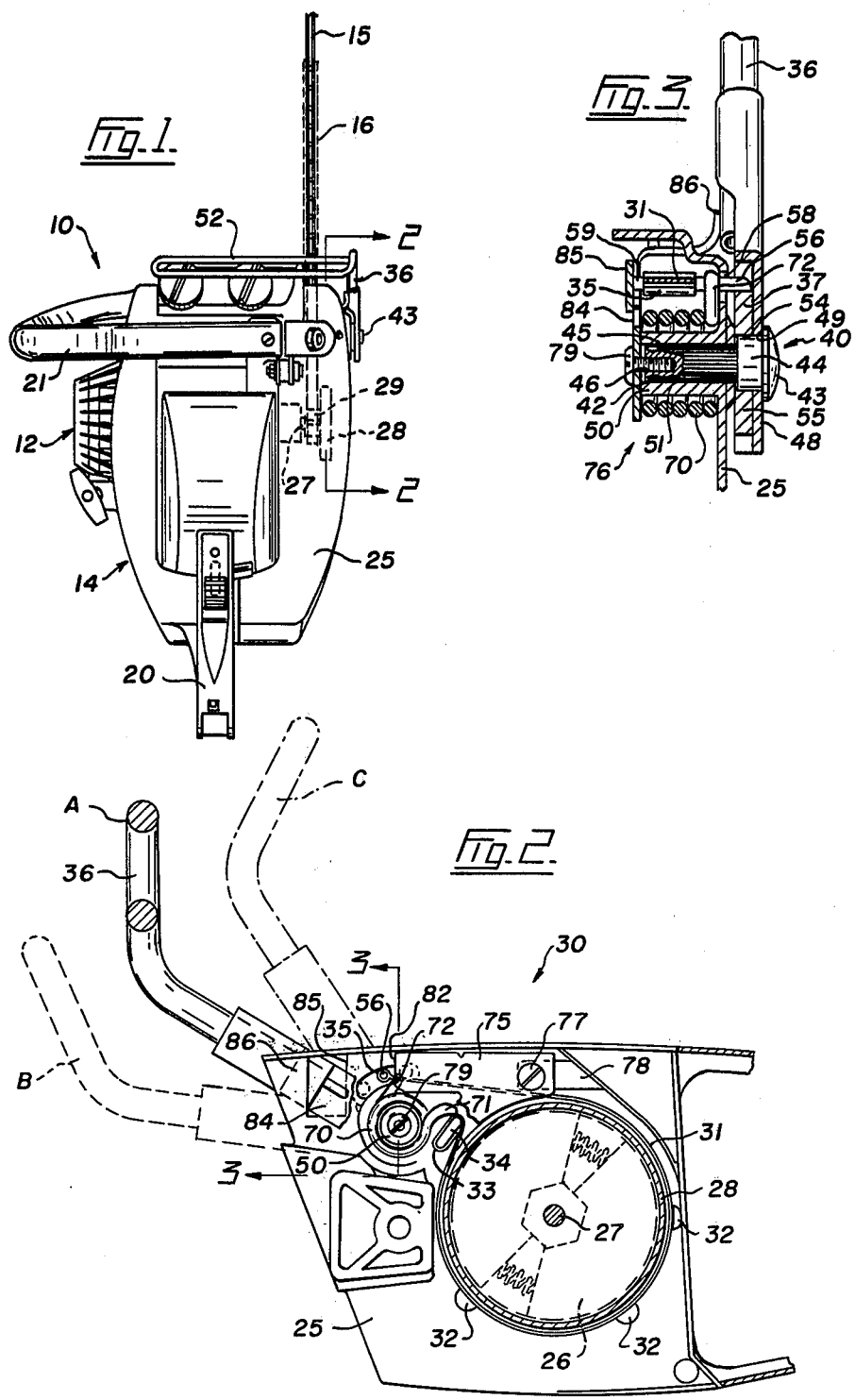

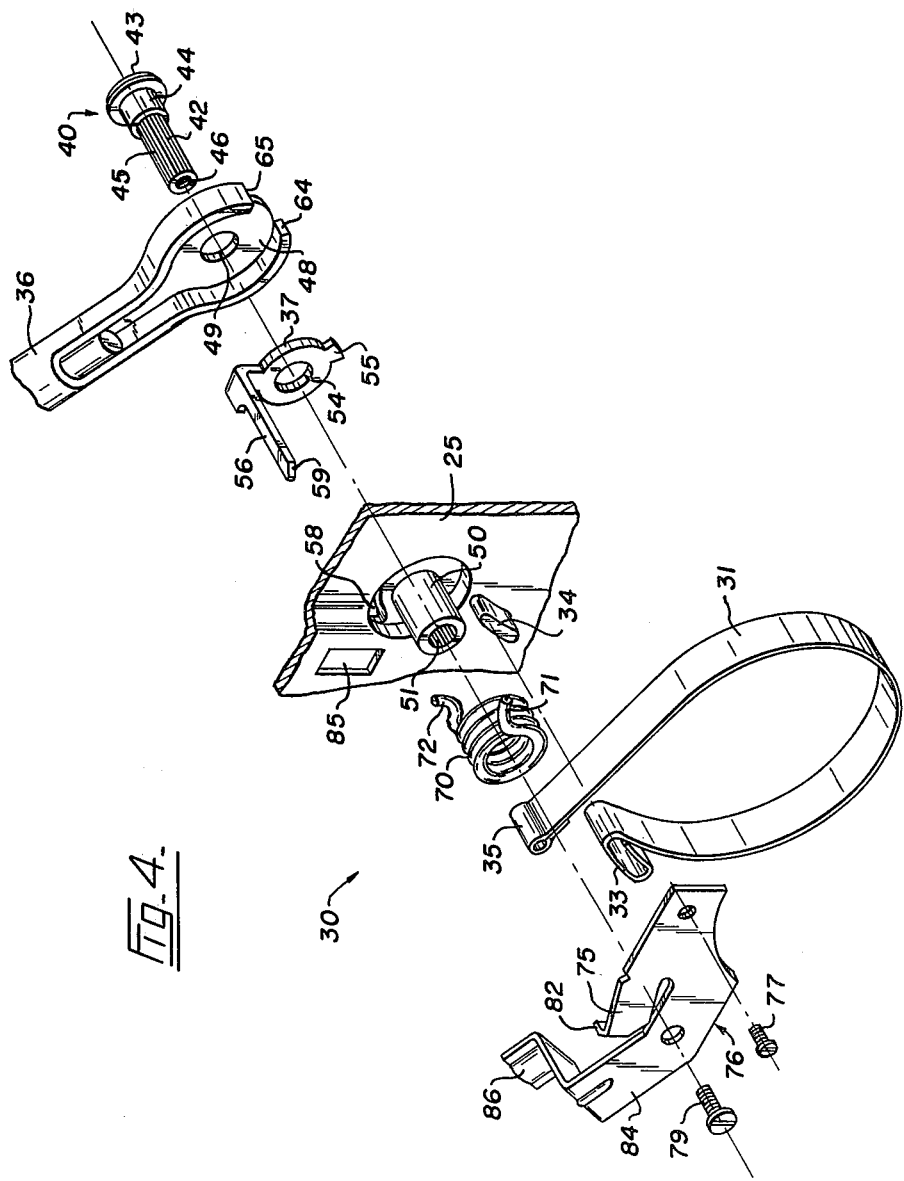

4,310,972

BRAKE CONTROL ASSEMBLY

BACKGROUND OF THE INVENTION

This invention relates to emergency brakes for power saw and more particularly to a brake control assembly for a chain saw.

It is well known that a serious disadvantage of chain saws is the tendency for the saw to swing up towards the face and chest of the operator whenever the forward running chain, generally at the top of the nose of the chain-supporting cutter bar, encounters an obstruction. This kick-back characteristic as it is often referred to has been the cause of a number of accidents and some saw manufacturers make their products safer to operate by providing guards and the like for the saw chain. Such guards do serve their intended purpose but they constitute an awkwardly-situated attachment on the saw. The saw can be kept free of cumbersome chain guards by employing a brake but attempts along this line have increased the cost and the weight the chain saw and they are objected to for other reasons as well.

SUMMARY OF THE INVENTION

The present invention provides braking means for a saw chain which is applied automatically to safeguard the operator and which can be reset quite readily after each emergency braking action. More specifically, a brake control assembly in accordance with the present invention comprises an operating lever having a hub portion and a guard portion, pivot means securing the hub portion to a side of the housing of the saw with the guard portion located adjacent and parallel to a handle carried by the housing, a brake drum associated with the drive-transmitting mechanism of the saw, a brake band encircling the brake drum and having one end anchored to the housing, an actuating plate rockingly mounted on the pivot means for movement independently of the hub portion, a cam finger on the actuating plate attached to an opposite end of the brake band, spring means tending to rock the actuating plate in one direction and urge the brake band into braking engagement with the brake drum, a resilient latch on the housing normally engaging the cam finger to hold the brake band out of braking engagement with the brake drum, and drive means operatively connecting the operating lever to the actuating plate.

BRIEF DESCRIPTION OF THE DRAWINGS

FIG. 1 is a plan view of a chain saw fitted with the present brake control assembly, FIG. 2 is an enlarged part sectional and part elevational view taken on the line 2—2 of FIG. 1 and showing the assembly in greater detail, FIG. 3 is a vertical section taken on the line 3—3 of FIG. 2, and FIG. 4 is an exploded perspective view showing the several parts making up the present brake control assembly.

DESCRIPTION OF THE PREFERRED EMBODIMENT

Referring first to FIG. 1 of the drawings, the numeral 10 indicates generally a chain saw which is powered by an internal combustion engine 12 enclosed mainly within an housing 14. A cutter bar 15 projects forwardly from the housing and an endless saw chain 16, adapted to be driven by the engine, extends circumferentially around this bar. The operator of the saw supports the device by gripping a rearwardly projecting handle 20 in his right hand and a transversely extending handle 21 in his left hand. The saw is provided with the usual throttle and other engine controls which can be actuated while the saw is held by the two handles. The housing 14 includes a bolted-on right side portion or cover 25 for some of the moving parts of the engine. These moving parts include a centrifugal clutch 26 (FIG. 2 only) which is mounted on a drive shaft 27 of the engine 12. The clutch 26, when rotated at a predetermined high speed, expands into driving contact with a drum 28. A sprocket 29 (FIG. 1) is secured to the drum 28 and the saw chain 16 meshes with the teeth of this sprocket. The interconnected sprocket and drum freewheel on the drive shaft 27 when the engine is not running at normal operating speed but otherwise drive is transmitted from the engine to the saw chain through the centrifugal clutch. The foregoing chain saw and drive mechanism are of conventional design and further detailed description is not considered necessary.

The present invention is a brake control assembly for the chain saw 10, the assembly being generally indicated by the numeral 30. This assembly 30 is fitted to the saw to provide means for stopping the saw chain 16 in an emergency and therefor it is associated with the drive-transmitting mechanism between the engine 12 and the saw chain. An essential part of the drive-transmitting mechanism is the clutch drum 28 which is used as a brake drum by the assembly 30.

The brake control assembly 30 is shown in the drawings mounted on the cover 25 as will be seen best in FIG. 2. Assembly 30 comprises a flexible brake band 31 which is mounted inside the cover to encircle the brake drum 28. Stops 32 are provided on the cover to limit expansion of the brake band. One end 33 of the brake band is anchored to a post 34 carried by the cover to project inwardly. The band 31 has an opposite end 35 which is formed into a loop, see particularly FIG. 4, the loop located above and forward of the anchor post 34.

In order to operate the brake provided by the drum 28 and the band 31, the present assembly includes an operating lever 36 and an actuating plate 37 both of which are pivotally mounted on the housing cover 25 by pivot means 40 which will be understood best by reference to FIGS. 3 and 4.

The pivot means generally indicated at 40 is shown as comprising a pivot pin 42 having a head 43, a shoulder 44, a splined shank 45, and an internally threaded bore 46 extending into the end of the shank opposite the head. A lower hub portion 48 of the operating lever is provided with a bearing opening 49 through which the shoulder 44 projects. The cover 25 has an inwardly-projecting sleeve 50 and a bore 51 of this sleeve is splined to receive the pivot pin 42 whereby to hold it against rotation. This arrangement pivotally secures the lever 36 to the housing cover 25 with the lever extending from the pivot means 40 a short distance alongside the outer face of the cover thence projecting upwardly and forwardly as shown in FIGS. 1 and 2. Above the housing cover, the lever has a transversely-extending guard portion 52 which is located just ahead of the front handle 21 of the saw and extending parallel to that handle as shown in FIG. 1.

The actuating plate 37 is also rotatably mounted on the shoulder 44 of the pivot pin between the hub portion 48 of the lever and the outer face of the housing cover.

This washer-like plate 37 has a bearing opening 54 which rides on the shoulder 44. A radial lug 55 is provided on the edge of the plate 37. Opposite this lug, the plate has an integral finger 56 which projects inwardly through a slot 58 formed in the housing cover. The finger 56 projects through the looped end 35 of the brake band 31 and an inner end 59 of the finger is shaped as a cam for reasons which will be made apparent later. It will be appreciated that the plate 37 has limited rocking movement independently of the hub portion 48 of the operating lever. The limited rocking movement is determined by the spacing between stops 64 and 65 which are provided on the hub portion 48, see particularly FIG. 4. The lug 55 on the actuating plate is located between these two circumferentially stops and the plate 37 and lever 36 are coupled together only when the lug is engaged by one or the other of the stops.

The brake control assembly includes a torsion spring 70 which fits over the sleeve 50 on the inside face of the housing cover 25. One end 71 of this short torsion spring is supported by the anchor post 34 on the cover. An opposite end 72 of the spring bears against the cam finger 56 and applies tension to the brake band 31 so that the band is biased towards engagement of the brake drum 28.

The band 31 is held out of engagement with the brake drum by a resilient latch 75 which forms an integral part of a leaf spring 76. A bolt 77 secures one end of the leaf spring to a boss 78 (FIG. 2) on the inside face of the housing cover. Another bolt 79 clamps the leaf spring to the inner end of the sleeve 50, this bolt entering the threaded bore 46 of the pivot pin 42. The latch 75 has an outwardly directed free end 82 which is disposed in the path of travel of the cam end 59 of the finger. Another part of the leaf spring 76 extends away from the bolt 79 to provide a resilient retainer 84. The retainer 84 projects laterally through an opening 85 in the housing cover and the free end 86 of this retainer is shaped to grip and releasably hold the operating lever 36 at one stage of the swinging movement of the lever.

The brake control assembly 30 constructed as above described provides the lever 36 with a normal operating position which is indicated at A in FIG. 2. At this time; the lever 36 is held by the free end 86 of the resilient retainer, the cam finger 56 is engaged by the free end 82 of the resilient latch, and the brake band 31 is supported clear of the brake drum 28.

The chain saw 10 can be operated in the normal manner when the several parts of the assembly 30 are set in this brake-off condition. Whenever the running saw chain 16 encounters an obstruction which causes the saw to kick-back, usually the saw operator can resist this backwardly and upwardly directed force mainly by bracing his left arm but at times the force may be great enough to cause his left hand to slip off the front handle 21. If this does occur, the operator's left hand strikes the guard portion 52 so that the lever 36 is pushed forward to the brake-on position indicated at B in FIG. 2. Forward rocking movement of the operating lever also rotates the actuating plate 37 counterclockwise (FIG. 2) since the stop 64 at this time is in contact with the lug 55 and the lever and plate rotate as a unit. The resulting rocking movement of the plate 37 pulls the cam end 59 of the finger out of engagement with the free end 82 of the resilient latch so that the torsion spring 70 is released to clamp the brake band 31 into braking engagement with the brake drum 28. This instant application of the braking means immediately brings the chain 16 to a halt so that the possibility of the saw operator being injured by the running chain is avoided.

To reset the brake control assembly 30, the lever 36 is pulled rearwardly to the position indicated at C in FIG. 2. The stop 65 at this time is in contact with the lug 55 on the actuating plate 37 so that the plate is rocked clockwise (FIG. 2) as the lever is pulled rearwardly. The cam end of the finger 56 passes under the end 82 of the resilient latch whereupon these parts are reengaged and the spring 70 is held in a wound-up condition with the band 31 out of contact with the drum 28. The lever 37 is then moved back to position A where it is again gripped and releasably held by the free end 86 of the resilient retainer.

From the foregoing, it will be apparent the present brake control assembly provides an extremely effective means for stopping a saw chain in an emergency. The assembly does not interfere in any way with normal running of the chain saw and the braking mechanism can be quickly and easily reset after each emergency application of the brake.

We claim:

1. In a chain saw having a power unit mounted in a housing, an endless saw chain adapted to be driven by the power unit, and a drive-transmitting mechanism between the power unit and the saw chain; a brake control assembly comprising an operating lever extending from the housing, said operating lever having a hub portion and a guard portion adjacent a handle on the housing, pivot means securing the hub portion to a side of the housing, a brake drum associated with the drive-transmitting mechanism, a brake band encircling the brake drum and having one end anchored to the housing, an actuating plate rockingly mounted on the pivot means for movement independently of the hub portion, a cam finger on the actuating plate attached to an opposite end of the brake band, spring means tending to rock the actuating plate in one direction and urge the brake band into braking engagement with the brake drum, a resilient latch on the housing normally engaging the cam finger to hold the brake band out of braking engagement with the brake drum, a resilient retainer on the housing normally engaging the operating lever to releasably hold the lever in a brake-off position, and drive means operatively connecting the operating lever to the actuating plate whereby the actuating plate is rocked with the operating lever about the pivot means to a brake-on position of the lever only when a force at least sufficient to disengage the resilient latch from the cam finger and the resilient retainer from the lever is applied to the lever.

2. A brake control assembly as claimed in claim 1, in which said drive means comprises a drive lug on the actuating plate, said hub portion of the operating lever having spaced stops, said drive lug being engaged by one of said stops when the operating lever is pivoted in one direction towards a brake-on position, and said drive lug being engaged by the other of said spaced stops when said operating lever is pivoted in an opposite direction towards a reset position.

3. In a chain saw having a power unit mounted in a housing, an endless saw chain adapted to be driven by the power unit, and a drive-transmitting mechanism between the power unit and the endless saw chain; a brake control assembly comprising an operating lever extending from the housing to a position adjacent a handle of the chain saw, said operating lever having a hub portion and a guard portion projecting across a front end of the housing, a pivot pin securing the hub portion to a side of the housing, a brake drum associated with the drive-transmitting mechanism, a brake band encircling the brake drum and having one end anchored to the housing, an actuating plate rockingly mounted on the pivot pin for movement independently of the hub portion, a cam finger on the actuating plate attached to an opposite end of the brake band, a torsion spring carried by the housing in engagement with the cam finger, said torsion spring biasing the brake band towards braking engagement with the brake drum, a resilient latch on the housing normally engaging the cam finger to hold the brake band out of braking engagement with the brake drum, a drive lug on the actuating plate, said hub portion of the operating lever having spaced stops, said drive lug being engaged by one of said spaced stops when the operating lever is pivoted in one direction towards a brake-on position whereby the cam finger is disengaged from the resilient latch, and the drive lug being engaged by the other of said spaced stops when said operating lever is pivoted in an opposite direction towards a reset position whereby the cam finger is reengaged with the resilient latch, and a resilient retainer on the housing adapted to releasably hold the operating lever in a brake-off position between the brake-on and the reset positions.

4. A brake control assembly as claimed in claim 3, in which said resilient latch and said resilient retainer form integral parts of a common leaf spring secured to the housing.

* * * * *